April 7, 1959    E. M. BROCKWAY ET AL    2,880,644
ALIGNMENT INTERFEROMETER
Filed Oct. 9, 1957    2 Sheets-Sheet 1
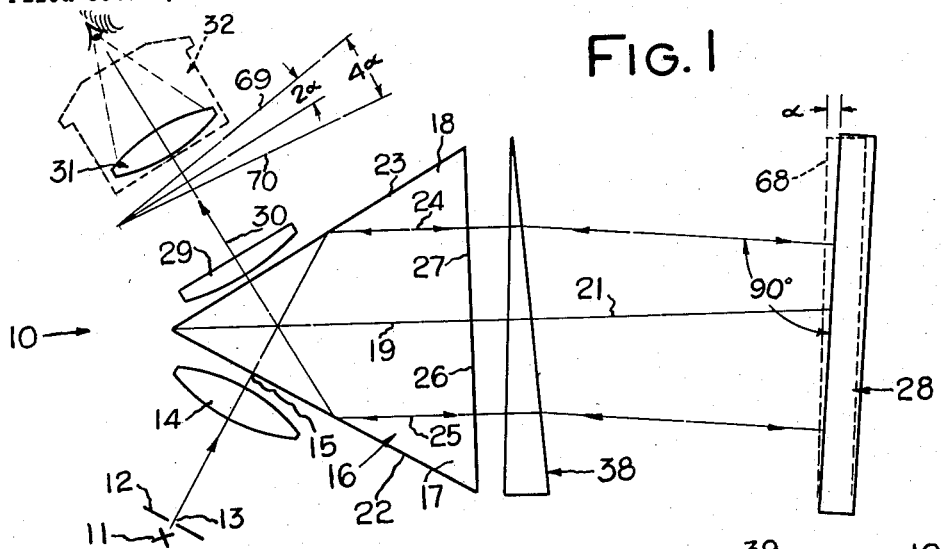
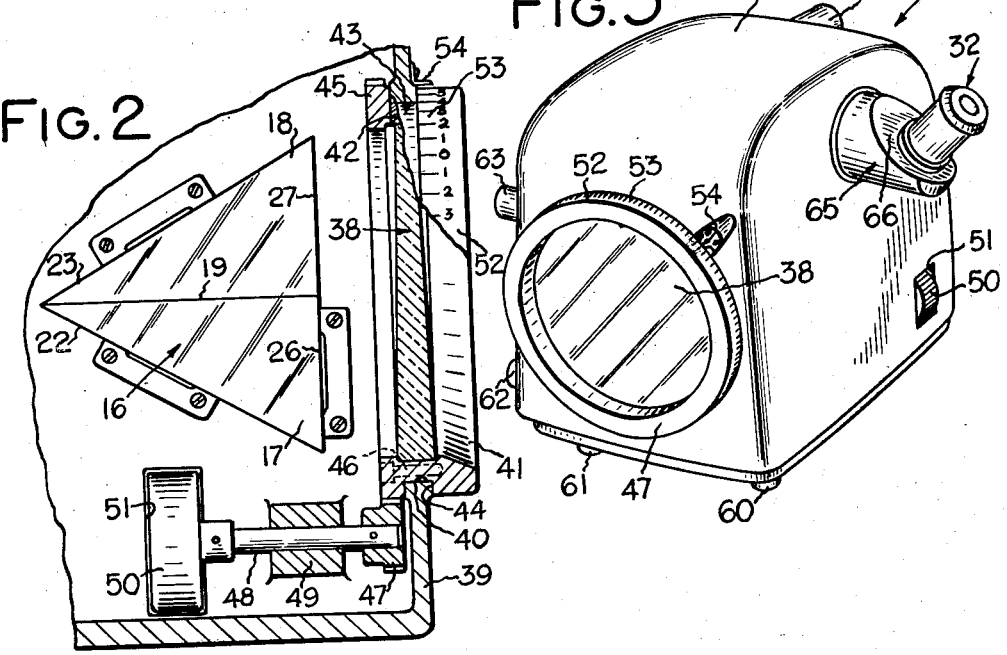
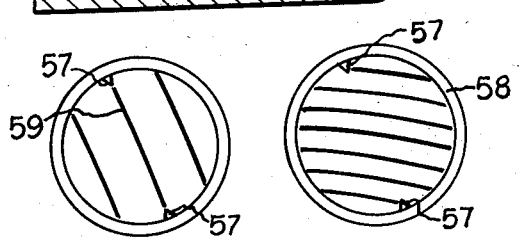
INVENTORS
ELLSWORTH M. BROCKWAY
DONALD R. HERRIOTT
BY *[signature]*
ATTORNEY

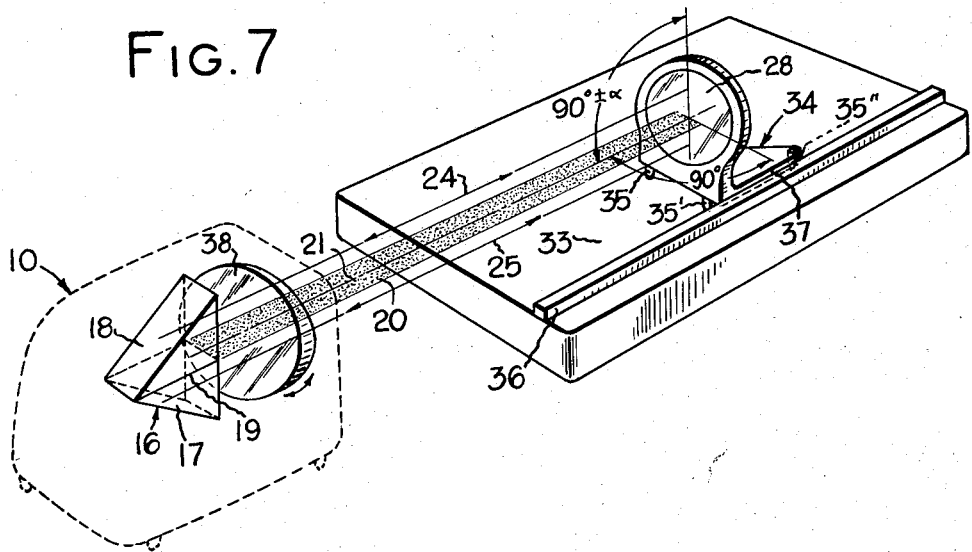
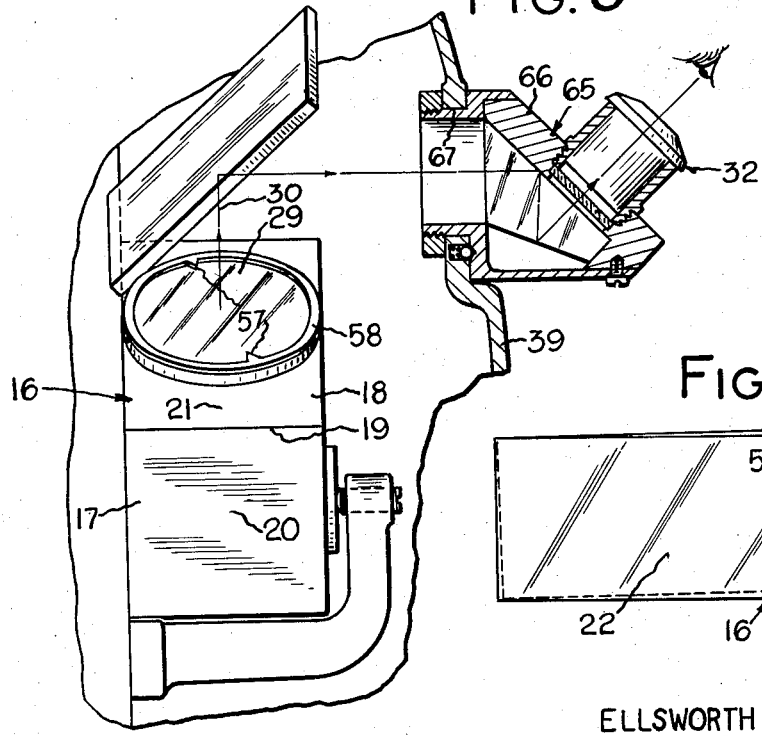
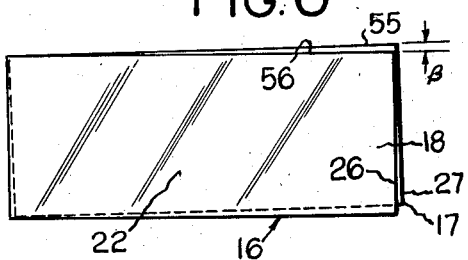

United States Patent Office 2,880,644
Patented Apr. 7, 1959

2,880,644

ALIGNMENT INTERFEROMETER

Ellsworth M. Brockway, Rochester, N.Y., and Donald R. Herriott, Morristown, N.J., assignors to Bausch & Lomb Optical Company, Rochester, N.Y., a corporation of New York Application October 9, 1957, Serial No. 689,228

3 Claims. (Cl. 88—14)

This invention relates to optical alignment apparatus and the like of the interferometric type and more particularly it relates to improved means for obtaining precise and minute angular measurements with this type of apparatus.

The use of interferometric means for measuring the alignment of extended flat surfaces such as surface plates, machine beds, and mounting pads heretofore has involved several undesirable features which have limited the scope of adaptability and convenience of use of such means. Most instruments of this kind are neither self-contained nor constructed as an operating unit and consequently they require tedious periods of arrangement, setting and adjustment. Furthermore, in many measuring problems, such interferometric measuring instruments require two or more operators to obtain good quantitative results and special mounting equipment for the instruments has been found necessary.

It is an object of this invention to provide an interferometric type of optical alignment apparatus which is compact and substantially self-contained for convenience of use and portability and in which the component parts of the interferometer are permanently adjusted in mechanical and optical alignment with each other for use as a preset unit.

Another object is to provide such a device which is adaptable to a variety of alignment testing problems with a minimum preadjustment period and which is easy to use and maintain in good working condition.

It is a further object to provide such a device which has its operating parts encased and protected from vapors, and foreign matter, the casing further serving to stabilize interior air conditions for maintaining all such parts at a constant operating temperature.

Another object is to provide such a device by which a single operator may quickly obtain very precise angular measurements of the tilt of one or more distant plane mirrors relative to a specified surface on the interferometer without leaving the instrument.

Further objects and advantages will be apparent in the details of construction and the arrangement and combination of parts by reference to the specification below and the accompanying drawing wherein:

Fig. 1 is a diagrammatic view of an interferometric alignment apparatus embodying our invention, Fig. 2 is a side elevation partly in section and fragmentarily showing certain details of our invention, Fig. 3 is a perspective view of the principal unit of our invention, Figs. 4 and 5 are semi-diagrammatic views of the field of view of the interferometric instrument, Fig. 6 is an exaggerated side elevational view of the relative positioning of the parts of the prism structure shown in Fig. 2, Fig. 7 is a schematic view showing the interferometer and certain auxiliary devices therefor in operating position, and Fig. 8 is a sectional view taken along the axis of the eyepiece shown in Fig. 3, transversely of the interferometer, certain parts thereof being partly broken away and shown in section.

This invention is constructed basically in the form of an interferometer 10 which comprises a monochromatic light source 11 as shown diagrammatically in Fig. 1 of the drawing and adjacent thereto is located a diaphragm 12 having a small aperture 13 therein. Axially aligned with the light source 11 and the aperture 13 is a collimating lens 14 which is focused upon said aperture so as to project a beam 15 of parallel light therefrom.

Located adjacent to the other side of the lens 14 is a triangular shaped beam divider 16 composed of two duplicate prisms 17 and 18 formed of glass or other transparent material having like optical properties. Preferably, the prisms 17 and 18 have the shape of a right triangle, the long sides of the right angles thereof being cemented together to form a beam splitting interface 19. In this form of the invention, the beam divider 16 has two hypotenuse faces 22 and 23 which meet at said interface 19 to form a total apex angle of less than 90 degrees.

The lens 14 is located adjacent to the hypotenuse face 22, the optical axis of the lens being substantially perpendicular thereto so as to produce oblique incidence of the beam 15 on the interface 19. At said interface 19, the beam 15 is divided into two substantially equal beams 24 and 25, beam 25 being reflected by the interface 19 back to the hypotenuse face 22 and beam 24 passing through the interface and being reflected by the hypotenuse face 23 into parallelism with beam 24 and also parallel to the interface. The parallel beams 24 and 25 pass out of the beam divider 16 through the optical surfaces 27 and 26, respectively, of the twin prisms 17 and 18, and are directed therefrom to impinge at normal incidence onto a distant plano mirror 28 which is held in substantially erect position by any suitable rigid stand or mechanism as described hereinafter. When the position of the mirror 28 is properly adjusted, the beams 24 and 25 are reflected back along their outgoing paths into the beam divider 16 where said beams meet in interfering relation at the interface 19.

At said interface, the beams 24 and 25 are recombined to form an interference pattern and together said beams pass out of the divider 16 through the hypotenuse face 23 and thence through a field lens 29 in the direction of the lens axis 30. Provided on said axis 30 is a suitable viewing lens system 31 which focuses said beams 24 and 25 into the eyepoint of the interferometer whereby the operator may view the aforesaid interference pattern. Said viewing lens system 31 is suitably mounted in a demountable eyepiece member 32 which is shown in Figs. 3 and 8.

By way of example, an apparatus for the inspection of the flatness of a plate 33 by the use of the interferometer 10 is shown in Fig. 7. For this purpose, the mirror 28 is held substantially erectly as aforesaid in optical alignment with the interferometer 10 by a suitable rigid base or stand 34 which is moved back and forth across the plate 33 in longitudinal paths parallel to the line of sight. Said stand 34 is provided with three supporting feet 35, 35' and 35" which are arranged in triangular formation, two of said feet 35' and 35" being aligned parallel to a central alignment axis 21 which is coincident with the aforementioned line of sight as shown in Fig. 7.

To guide the mirror stand 34 in said longitudinal paths, a straight guide rail 36 is temporarily secured magnetically or otherwise to the plate surface parallel to its longer edge and said line of sight and the longitudinal side of the stand 34 is formed with a flat surface 37 which is maintained in contact with the guide rail 36 while the stand is moved along said paths. As the stand 34 is moved along the guide rail, the lack of true flatness of the plate along said paths causes the front foot 35' and rear foot 35″ of the stand to rest at different levels which is evidenced by a corresponding inclination or tilt of the top of the mirror 28 toward or away from the interferometer 10 through an angle α as shown in Fig. 1. In effect, the inclination or tilt is accomplished by rocking the stand on the two front feet 35 and 35′.

For purposes of illustration, a portion of the plane 20 of the interface 19 is shown by shading in Fig. 7 extending from said interface to the mirror 28 and this plane includes the central alignment axis 21.

According to this invention, light deviating means are provided, preferably in the form of an optical deviation wedge 38 located adjacent to the exterior optical surfaces 26 and 27 of the beam divider, for deviating the parallel beams 24 and 25 into normal incidence upon the plano mirror 28 so that the tilt, 90°±α shown in Fig. 7, of said mirror relative to the interface plane 20 may be measured in a vertical plane which is coincident with the alignment axis 21. In the form of deviation mechanism shown and described, the deviation is made variable by rotating the optical deviation wedge 38 so that the parallel beams 24 and 35 are slightly obliquely deviated with respect to the alignment axis 21, but only the vertical component of deviation of the beam is used by the interferometer to determine the amount of tilt of the mirror 28.

Totally enclosing the beam divider 16, the light source 11 and other operating parts of the instrument is a casing 39 having an opening therethrough defined by a cylindrical seat 40, formed in that portion of the casing which lies contiguously to the optical surfaces 26 and 27 so as to provide for the passage therethrough of the parallel beams 24 and 25. The optical wedge 38 has a round peripheral shape and is held in any preferred manner in a mounting ring 41 which has an integral hub 42 protruding from one side whereon a cylindrical surface 43 is formed which is fitted for rotation onto the cylindrical seat 40 whereby the wedge 38 is rotatably mounted in the casing 39. To retain the mounting ring 41 on its seat 40, a radial shoulder 44 is formed on the ring to contact one side of the wall of the casing 39 and a radially projecting ring gear 45 is fixed to the inner end of the hub 42 of the mounting ring by any preferred means such as the screws 46 so that the gear abuts the other side of said wall.

For rotating the optical wedge 38, actuating means are provided comprising a pinion 47 which is fixed in any desired manner on a rotatable shaft 48 which is journaled in a protruding boss 49 on the casing 39 in such a position that the pinion meshes with the ring gear 45. At the opposite end of the shaft 48, a knob 50, which projects partially through a closely fitted opening 51 in the casing 39, is preferably provided for rotating the wedge 38 from a convenient location on the exterior of said casing as shown in Fig. 3. It will be seen that the optical wedge 38 as above described is arranged to rotate in a plane normal to the alignment axis 21. On an exterior cylindrical surface 52 of the mounting ring 41, there is formed a graduated scale 53 which cooperates with an index mark 54 formed in any preferred manner on the casing 39 to show the amount of deflection of the transmitted beams 24 and 25 in terms of fractional parts of degrees wherein the scale is divided or in other units.

Another feature of this invention resides in the means used for detecting the direction of tilt of the distant mirror 28 toward or away from the instrument 10 and out of erectness to the plane 20 of the interface 19. A great advantage may be gained by the operator of the instrument 10 by employing such tilt detection means as an integral part of the instrument since, said means eliminates the necessity of maintaining a second operator at the distant mirror 28 to determine independently the direction of tilt of said mirror by auxiliary measuring tools. Such detecting means firstly comprise a very minute relative rotational displacement or twist of the prisms 17 and 18 on their cemented interface 19 during the construction of the beam divider 16 so that their respective top surfaces or principal planes 55 and 56 (Fig. 6) make a slight angle β to each other and consequently their hypotenuse faces 22 and 23 are placed in slightly skewed relation to each other. This very minute relative displacement β is so adjusted as to cause a minimum of at least 3 to 5 interference fringes 59, as shown in Fig. 4, to be seen at the eyepoint of the instrument when the incident beams 24 and 25 coincide with their reflected beams after being reflected from the mirror 28. It will be understood that because of the aforesaid skewed relation of the hypotenuse surfaces 22 and 23, the central axes of the associated projected beams 25 and 24, respectively, do not strictly lie in the same vertical plane so that when they are reflected back to the interference point at the interface 19, said beams do not completely coincide as they would in ordinary interferometers but they are deliberately misaligned very minutely. The above-described novel construction produces the unusual phenomena that when the distant mirror 28 is inclined toward or away from the interferometer 10 out of erectness to the plane 20, the fringe pattern, as seen in the eyepiece 32, appears to rotate either clockwise or counterclockwise and the number of fringes progressively increases as the fringe pattern continues to rotate; clockwise rotation meaning, for instance, inclination of mirror 28 toward the interferometer and counterclockwise rotation thereof meaning inclination of the mirror away from the interferometer.

Secondly, such means comprise a pair of indicia marks 57 which are preferably formed interiorally on a flat ring 58 overlying the peripheral part of the field lens 29 where these marks may be seen on opposite sides of the visible field, as shown in Figs. 4, 5 and 8, despite some variation in the nominal magnification of the optical system. During the assembly of the interferometer 10, the ring 58 may be so adjusted angularly that when the instrument is in a condition to show said minimum number of fringes in the field of view, the indicia marks 57 appear at the two opposite ends of a single fringe 59 as shown in Fig. 4.

The interferometer 10 per se may be constructed in various optical and physical forms if desired but only a single form is shown and described. If desired, the optical paths of the light beams in the vicinity of the axes 15 and 30 may include additional or alternate mechanisms such as beam deflectors, beam folding devices or diaphragming mechanism, not shown, for modifying the operation, usefulness or performance of the interferometer.

A particular advantage of this invention, as heretofore mentioned, as the construction whereby the casing 39 encloses the entire mechanism of the interferometer 10, the openings for the knob 50, mounting ring 41 and eyepiece 32 being closely fitted so that the internal parts are protected and maintained in clean and thermally controlled operating condition. It will be observed that the optical wedge 38 not only operates to deflect the parallel beams 24 and 25 but further acts as a window for the casing 39, thereby serving two purposes.

To permit the instrument to rest on its side or its end as occasion may demand, the casing 39 is provided on three sides with adjustable feet or pads 60, 61, 62, 63 and 64 and partly shown in Fig. 3 of the drawing, said feet being adjustable only for height. Three of such adjustable feet are provided on each of said three sides, said feet being arranged in a conventional manner to provide slight leveling motions in a vertical plane coincident with the alignment axis 21 and with another plane normal thereto.

In Figs. 3 and 8 is shown a sidewardly projecting eyepiece mounting body 65 having an inclined mounting plate 66 whereon the eyepiece 32 is fixed in any desired manner such as by the threaded connection shown. Said body 65 is rotatably mounted as shown in Fig. 8 in an opening 67 in the casing 39 so that the eyepiece 32 is inclinably held and may be rotated into various angular positions for comfortable use of the operator when using the instrument 10 in various positions.

With regard to the use of this instrument, no special supports or holding mechanisms are necessary since the casing 39 may rest upon any firm surface such as a bench or platform where it remains stationary and in effect, it provides a reference plane, which is the plane 20 of the interface 19, for use as a reference surface during the alignment measurement procedure. There is an optimum range of working distances between the interferometer 10 and the mirror 28 for every combination of the essential constructional details of the instrument and said range may be increased usually by decreasing the size of the aperture 13 and increasing the brightness of the light source 11. Repeated tests of instruments constructed as above described have demonstrated that satisfactory performance may be had in full daylight over distances of forty feet or more.

With regard to the inspection procedure followed when using the flatness testing apparatus shown in Fig. 7, the surface plate 33 is inspected in parallel bands by moving the mirror stand 34 in steps along the guide rail 36 and then moving the rail laterally to successive parallel positions, whereat flatness readings are again taken along the rail so as to provide information for the construction of a flatness chart. Preparatory to testing, the interferometer 10 is mounted horizontally on a steady support which is about level with said surface plate and the interferometer is directed at the testing mirror 28 and properly leveled by adjusting the feet 60, 61, etc.

The optical wedge 38 is rotated to zero position by the knob 50 and the lamp 11 is turned on. A bright image of the aperture 13 is projected by the collimating lens 14 through the beam divider 16 and the resulting emergent beams 24 and 25 are projected therefrom in parallelism to the mirror 28 along the alignment axis 21. With the mirror stand 34 lying against the rear portion of the guide rail 36, the rear foot 35″ of the stand is adjusted to move the mirror 28 fore and aft in a vertical plane which is coincident with the axis 21 into the dotted line erect position 68 (Fig. 1) in which position the beams 24 and 25 are reflected back upon themselves and reenter the beam divider 16 where an interference pattern is formed and may be seen in the eyepiece 32 as heretofore described.

At this point, the supporting feet 60, 61 etc. of the casing 39 are adjusted so as to produce the minimum number of interference fringes in the field of view and when this condition is achieved, the two index marks 54 should appear at opposite ends of a single fringe as shown in Fig. 4. Now the apparatus is in proper condition for actual testing of the plate 33.

Progressively, the mirror stand 34 is advanced from place to place along the rail 36 and at each place, the mirror 28 will tilt in the aforementioned vertical plane out of erectness with the plane 20 by an amount corresponding to the angle ±α as shown by the solid line position of the mirror in Fig. 1 and in conformity with the amount and direction of the departure from true flatness at each place. Considering inclination of the mirror 28 toward the interferometer as plus tilt and the contrary as minus tilt for instance, these opposite positions are evidenced by the rotation of the fringe pattern counterclockwise and an increase in the number of fringes in the case of plus tilt and minus tilt is indicated by clockwise rotation and increase in the number of said fringes.

In order to measure the amount and direction of tilt, the knob 50 and consequently the deviation wedge 38 is rotated in the proper direction until the aforesaid minimum fringe pattern is reestablished as shown in Fig. 4 in the field of view which indicates that the beams 24 and 25 are again brought into normal incidence on the mirror 28. By reading the scale 53, which is divided into "minus tilt" and "plus tilt" sections, the exact amount and direction of tilt of the mirror 28 or measure of departure from true flatness of plate 33 is determined.

Much like a conventional scanning operation, the guide rail 36 is moved laterally a short distance after completing one line of inspections and the flatness of the plate 33 is inspected along a line parallel to the first said line and so on until the desired area of the plate is charted for non-planar defects.

It is advantageous that there is an angular magnification effect of the tilt of the mirror 28 as seen in the eyepiece 32 due to the relative tilts of two wave fronts 69 and 70 when emerging from the beam divider 16. Assuming that the mirror 28 stands at the angle α to the oncoming wave front, this wave front will be reflected at an angle 2α back to the beam divider 16. After reflections from the opposite sides 22 and 23 of the beam divider, two divergent wave fronts 69 and 70 are formed opposed to each other so that these wave fronts have an included angle of 4α which is increasingly perceptible as long as the mirror remains out of "normal incidence" position. Angular measurements as small as 0.1 second of arc have been made in this way. Since the scale 53 is calibrated in angular degrees of deviation of the beams 24 and 25, the readings are independent of the projection distance between the interferometer and the mirror 28.

If a problem arises in which the surface under test is vertical, the instrument may be placed on its side with the plane interface 19 parallel to said surface and the casing 39 resting on the feet 62 and 63 and one other adjustable foot, not shown. The eyepiece 32 may then be rotated on its seat 67 to permit comfortable use by the operator. In this position, the knob 50 of the instrument is on top where it is most accessible and the index mark 54 is located near the eyepiece where it is easily seen. Likewise, the instrument may be stood on end, using the feet one of which is shown at 64, and in this position the alignment of vertical surfaces may also be tested following the same general procedure as above outlined. It will be noted that when the instrument is used standing on end, the control knob 50, index 54 and eyepiece 32 are still conveniently located for the operator.

Only one use of the interferometer 10 has been described and illustrated in detail although numerous uses and adaptations may be made involving the precise measurement of angles by merely providing suitable mirror structure 28 and mirror supporting structure 34. Such diverse uses include determinations of straightness of lathe beds and jig bore tables, and straightness of travel of lathe carriages, etc. The accuracy of the instrument is dependent principally on the ordinary skill required to return the visible fringes in the field of view to a condition of "least fringes" exactly like the original setting above described and shown in Fig. 4. The optical surfaces constituting the interface 19 need not be of perfect optical quality since the fringes need not be straight in actual practice.

In the generic sense, the invention is not limited to the preferred form of interferometer illustrated and described inasmuch as other double-beam interferometers may be substituted therefor. Furthermore, the beam deflecting means need not be an optical wedge as shown since other optical beam deflectors such as an inclined plate or certain prism mechanisms and mirrors may be used in combination with the double beam interferometer to provide an effective alignment measuring apparatus in fulfillment of the objects of this invention.

What we claim is:

1. An interferometric alignment measuring optical apparatus comprising a casing for enclosing said apparatus, means within the casing for providing a collimated beam of monochromatic light, a beam divider comprising a pair of similar right triangular prisms wherein a side of one prism is cemented to the corresponding side of the other prism to form a beam splitting interface whereby said collimated beam is divided into two beams of substantially equal intensity, said divider being constructed to direct said two beams in parallelism with each other externally thereof onto a plano reflecting mirror, the angular position of which with respect to the plane of said interface is to be measured, said beams being reflected back therefrom along their outgoing paths to meet at said interface where an interference pattern is formed, an optical deviation wedge rotatably mounted across said parallel beams adjacent to an optical surface on said divider for variably deviating said beams, mounting means cooperatively formed on said casing and said deviation wedge for rotatably mounting one on the other, and coacting scale and index means cooperatively constructed and carried by said casing and wedge to indicate the amount of deviation of said beams and tilt of said mirror relative to the plane of said interface, and viewing means located in said beams adjacent to an exit surface of said beam divider and optically aligned to view said interference fringes, the aforesaid prisms being turned slightly on their cemented interface relative to each other so that their corresponding hypotenuse sides are minutely skewed to each other by the amount required to produce at least 3 to 5 interference fringes in the field of view, whereby when the mirror is inclined toward the beam divider the relative skew between the two corresponding hypotenuse sides causes said interference pattern to rotate in a direction opposite to that produced when said mirror is inclined away from the beam divider, the amount of such inclination of the mirror being indicated by the increasing number of fringes that are seen in said field of view as the inclination of the mirror is increased.

2. In an interferometric alignment measuring optical apparatus, the combination of means including a monochromatic light source for projecting a collimated beam of light, a triangular beam divider comprising two duplicate right triangular prisms which are cemented together along a corresponding face of each prism to form a beam splitting interface which bisects one apex angle of said beam divider and which is optically aligned to receive said beam of light, said prisms being slightly turned relative to each other on their cemented interface so that their respective hypotenuse sides are minutely skewed to each other by an amount sufficient to produce a minimum of 3 to 5 interference fringes in the field of view of the instrument, said beam being split at said interface into two beams which are subsequently reflected respectively from said hypotenuse sides into substantially parallel paths which extend externally of said divider to a plano mirror whose tilt relative to the plane of said interface is to be measured, said beams being reflected back along their outgoing paths and meeting at said interface where an interference fringe pattern is formed, viewing means optically aligned to view said interference fringe pattern, the skewed relation of said hypotenuse sides causing said interference pattern to rotate in one direction in said field of view when said mirror is tilted toward the interferometer and to rotate in the opposite direction when the mirror is tilted away from the interferometer, and indicia means located in a fixed position on a median axis relative to said viewing means to indicate the aforesaid direction of rotation of the fringe pattern in the field of view.

3. An interferometric alignment measuring optical apparatus comprising means including a monochromatic light source for projecting a collimated beam of light, a beam divider comprising two like prisms which are cemented together along a corresponding face of each prism to form a beam splitting interface which is optically aligned to receive said beam of light, said beam being split at said interface into two beams of substantially equal intensity, said divider having means by which said beams are reflected from the beam divider into substantially parallel paths extending externally thereof to a plano mirror whose tilt with respect to the plane of said interface is to be measured, said beams being reflected back along their outgoing paths so as to meet at said interface where an interference pattern is formed, said prisms being slightly turned on their cemented interface relative to each other by an amount sufficient to produce a minimum of 3 to 5 interference fringes in the field of view of the instrument, a casing enclosing said apparatus, and indicia means fixed in a median position with reference to said field of view so that inclination of said mirror away from erectness with respect to the plane of the interface toward said divider is evidenced by tilt of said fringes to one side of the indicia means and inclination of the mirror in the opposite direction is evidenced by tilt of said fringes to the other side of said indicia means, an optical deviation wedge rotatably mounted with respect to said divider across said beams for variably deviating said beams, mounting means operatively carried by said wedge and casing for rotatably mounting one on the other, actuating means carried jointly by said casing and said mounting means for rotating said optical deviation wedge, and coacting scale and index means carried respectively by said mounting means and said casing to indicate by the rotational position of said wedge the deviation of the parallel beams and the related tilt of said mirror caused by the passage of the beams through said wedge when the fewest fringes are seen in the field of view.

References Cited in the file of this patent

UNITED STATES PATENTS

| | | |
|---|---|---|
| 2,424,976 | Golay et al. | Aug. 5, 1947 |
| 2,701,961 | Svensson | Feb. 15, 1955 |
| 2,830,488 | Agnew | Apr. 15, 1958 |

FOREIGN PATENTS

| | | |
|---|---|---|
| 595,211 | Germany | Apr. 12, 1934 |